US010677744B1

(12) United States Patent
Bitter et al.

(10) Patent No.: US 10,677,744 B1
(45) Date of Patent: Jun. 9, 2020

(54) MULTI-CONE X-RAY IMAGING BRAGG CRYSTAL SPECTROMETER

(71) Applicant: Energy, United States Department of, Washington, DC (US)

(72) Inventors: Manfred Bitter, Princeton, NJ (US); Kenneth W. Hill, Plainsboro, NJ (US); Philip Efthimion, Bedminster, NJ (US); Luis Delgado-Apariccio, Princeton, NJ (US); Novimir Pablant, Princeton, NJ (US); Lan Gao, Princeton, NJ (US); Brian Kraus, Princeton, NJ (US)

(73) Assignee: U.S. Department of Energy, Washington, DC (US)

( * ) Notice: Subject to any disclaimer, the term of this patent is extended or adjusted under 35 U.S.C. 154(b) by 209 days.

(21) Appl. No.: 15/614,545

(22) Filed: Jun. 5, 2017

Related U.S. Application Data

(60) Provisional application No. 62/345,441, filed on Jun. 3, 2016.

(51) Int. Cl.

| | |
|---|---|
| ***G01N 23/20*** | (2018.01) |
| ***G01N 23/20008*** | (2018.01) |
| ***G01N 23/20091*** | (2018.01) |
| ***G01N 23/207*** | (2018.01) |
| ***G21K 1/06*** | (2006.01) |

(52) U.S. Cl.

CPC ....... *G01N 23/20008* (2013.01); *G01N 23/20* (2013.01); *G01N 23/207* (2013.01); *G01N 23/20091* (2013.01); *G21K 1/06* (2013.01); *G21K 1/062* (2013.01); *G01N 2223/05* (2013.01); *G01N 2223/056* (2013.01); *G01N 2223/0568* (2013.01)

(58) Field of Classification Search

CPC ............... G01N 23/20; G01N 23/2008; G01N 23/20091; G01N 23/207; G01N 2223/05; G01N 2223/056; G01N 2223/0568; G01N 23/20008; G21K 1/06; G21K 1/062

USPC ........................................ 378/71–73, 84, 85

See application file for complete search history.

(56) References Cited

U.S. PATENT DOCUMENTS 4,084,089 A * 4/1978 Zingaro ................. B82Y 30/00 378/84
4,238,529 A * 12/1980 Sicignano .............. B82Y 10/00 378/43
4,949,367 A * 8/1990 Huizing ............. G01N 23/2076 378/82
5,127,028 A * 6/1992 Wittry ...................... G21K 1/06 378/81
5,528,364 A * 6/1996 Koike .................. G01J 3/1804 250/505.1

(Continued)

*Primary Examiner* — Allen C. Ho

(74) *Attorney, Agent, or Firm* — Timothy L. Harney; Daniel D. Park; Brian J. Lally

(57) ABSTRACT

Embodiments provide a multi-cone X-ray imaging Bragg crystal spectrometer for spectroscopy of small x-ray sources with a well-defined spectral resolution. The spectrometer includes a glass substrate machined to a multi-cone form; and a thin crystal slab attached to the glass substrate, whereby the multi-cone X-ray imaging Bragg crystal spectrometer provides rotational symmetry of a ray pattern, providing for accurate imaging, for each wavelength in the spectral range of interest. One or more embodiments include a streak camera and/or a gated strip detector.

9 Claims, 22 Drawing Sheets

10

(56) References Cited

U.S. PATENT DOCUMENTS 5,923,720 A * 7/1999 Barton ................... B82Y 10/00 378/83
6,038,285 A * 3/2000 Zhong ...................... G21K 1/06 378/79
6,236,710 B1 * 5/2001 Wittry ...................... G21K 1/06 378/82
6,259,763 B1 * 7/2001 Bitter ..................... G01N 23/20 378/82
6,285,506 B1 * 9/2001 Chen ........................ G21K 1/06 359/642
6,317,483 B1 * 11/2001 Chen ...................... B82Y 10/00 378/145
6,498,830 B2 * 12/2002 Wittry ...................... G21K 1/06 378/82
6,697,454 B1 * 2/2004 Nicolich .................. G21K 1/06 378/48
6,816,570 B2 * 11/2004 Janik ...................... G01N 23/20 378/50
6,829,327 B1 * 12/2004 Chen .................... G01N 23/223 378/44
6,934,359 B2 * 8/2005 Chen ...................... B82Y 10/00 378/45
7,035,374 B2 * 4/2006 Chen ........................ G21K 1/06 378/84
7,092,843 B2 * 8/2006 Moore ................... G01N 23/20 702/179
7,206,375 B2 * 4/2007 Chen ...................... G01N 23/02 378/51
7,248,670 B2 * 7/2007 Hoghoj .................. B82Y 10/00 378/145
7,366,374 B1 * 4/2008 Lee .......................... G21K 1/06 378/101
7,412,131 B2 * 8/2008 Lee .......................... G21K 1/06 378/21
7,415,096 B2 * 8/2008 Sherman .................. G21K 1/06 378/70
7,508,911 B1 * 3/2009 Lee ........................ B82Y 10/00 378/84
7,519,153 B1 * 4/2009 Moore ................... G01N 23/20 378/70
7,583,789 B1 * 9/2009 MacDonald ........... B82Y 10/00 378/70
7,738,629 B2 * 6/2010 Chen ........................ G21K 1/06 378/84
7,738,630 B2 * 6/2010 Burdett, Jr. ............ B82Y 10/00 378/84
7,742,566 B2 * 6/2010 Hopkins ................ B82Y 10/00 250/505.1
7,933,383 B2 * 4/2011 Verman .................. B82Y 10/00 378/145
7,991,116 B2 * 8/2011 Chen ...................... B82Y 10/00 250/503.1
8,058,621 B2 * 11/2011 Kommareddy ...... G01N 23/207 250/364
8,217,353 B1 * 7/2012 Bitter ........................ G01J 3/20 250/336.1
8,422,633 B2 * 4/2013 Lantz ............... G01N 23/20008 378/84
8,503,611 B2 * 8/2013 Kikuchi ............... G01N 23/207 378/74
8,559,597 B2 * 10/2013 Chen .................... G01N 23/223 378/85
8,983,032 B2 * 3/2015 Imazono .................. G21K 1/06 378/85
9,312,039 B2 * 4/2016 Lidestri .................... G21K 1/06
9,335,282 B2 * 5/2016 Omote ................. G01N 23/207
9,449,780 B2 * 9/2016 Chen ....................... H01J 35/08
9,594,036 B2 * 3/2017 Yun ...................... G01N 23/223
9,606,073 B2 * 3/2017 Mazor .................. G01N 23/201
9,714,907 B2 * 7/2017 Matsushita ............ G01N 23/20
9,761,340 B2 * 9/2017 Qian ........................ G21K 1/00
9,823,203 B2 * 11/2017 Yun ......................... H01J 35/08
10,175,185 B2 * 1/2019 Kawahara .............. G01N 23/22

* cited by examiner

MULTI-CONE X-RAY IMAGING BRAGG CRYSTAL SPECTROMETER

CROSS REFERENCE TO RELATED APPLICATION

This application claims the benefit of, and priority from, U.S. Provisional Application No. 62/345,441 filed Jun. 3, 2016, which is incorporated herein by reference in its entirety.

STATEMENT OF GOVERNMENT SUPPORT

The United States Government has rights in this invention pursuant to Grant No. DE-AC02-09CH11466 between the U.S. Department of Energy and Princeton University.

FIELD OF THE INVENTION

One or more embodiments relate to an imaging spectrometer. More specifically, the disclosed device is a multi-cone x-ray imaging Bragg crystal spectrometer for the spectroscopy of small (point-like) x-ray sources.

BACKGROUND

By way of background, Von Hamos and Hall's spectrometers have been used in the past at laser facilities. FIG. 1 depicts the geometry of the von Hamos spectrometer. The source and its images for different Bragg angles θ are on the cylinder axis, an axis of rotational symmetry. The imaging equation is $1/p+1/q=2 \sin(\theta)/R$.

Hall's 'single-cone' crystal spectrometer design was introduced in 1984 and has become the standard x-ray crystal spectrometer for time-resolved spectral measurements at the National Ignition Facility (NIF) in Livermore, the Omega Laser Facility in Rochester, and other laser facilities. FIG. 2 depicts the geometry of Hall's conical crystal spectrograph. The imaging equation is still valid for all Bragg angles, although this spectrograph instrument, as provided herein. In Hall's spectrometer the ray patterns do not have rotational symmetry And since this is a basic requirement for accurate imaging, Hall's spectrometer violates basic Physics laws. As a result, (a) the spectral resolution of hall's spectrometer is not even defined; and (b) large imaging errors occur as the size of the crystal, which is the x-ray reflecting and x-ray focusing element of an x-ray spectrometer, is increased. The size of the x-ray reflecting area in Hall's spectrometer is therefore small, typically only 2 cm×3 cm. On the other hand, the photon throughput (light intensity) is proportional to the size of the crystal, so that in Hall's spectrometer the photon throughput is limited by the small crystal size.

The source and its images for different Bragg angles θ are on the cylinder axis, an axis of rotational symmetry, so that the Hall's spectrometer the ray patterns do not have rotational symmetry And since this is a basic requirement for accurate imaging, Hall spectrometer violates basic Physics laws. As a result, (a) the spectral resolution of hall's spectrometer is not even defined; and (b) large imaging errors occur as the size of the crystal, which is the x-ray reflecting and x-ray focusing element of an x-ray spectrometer, is increased. The size of the x-ray reflecting area in Hall's spectrometer is therefore small, typically only 2 cm×3 cm. On the other hand, the photon throughput (light intensity) is proportional to the size of the crystal, so that in Hall's spectrometer the photon throughput is limited by the small crystal size. This instrument is deeply flawed due to the fact that the source is NOT on an axis of rotational symmetry. Hall's spectrometer is therefore not an imaging spectrometer and its spectral resolution is not even defined.

There is a need for an x-ray imaging spectrometer with a well-defined spectral resolution for a selectable, i.e., arbitrary, range of Bragg angles as noted in the Appendix.

SUMMARY

One embodiment relates to a multi-cone X-ray imaging Bragg crystal spectrometer for spectroscopy of small x-ray sources with a well-defined spectral resolution. The spectrometer includes a glass substrate machined to a multi-cone form; and a thin crystal slab attached to the glass substrate, whereby the multi-cone X-ray imaging Bragg crystal spectrometer provides rotational symmetry of a ray pattern, providing for accurate imaging, for each wavelength in the spectral range of interest. One or more embodiments include a streak camera and/or a gated strip detector.

At least one other embodiment relates to a method for spectroscopy of small x-ray sources employing a spectrometer. The spectrometer includes a glass substrate machined to a multi-cone form; and a thin crystal slab attached to the glass substrate. The method includes providing rotational symmetry of a ray pattern; accurately imaging each wavelength in the spectral range of interest. One or more embodiments relate to making the spectral resolution well defined and very large depending at least on the quality of the crystal, wherein the spectral resolution is $E/\Delta E=10{,}000$. In at least one embodiment, the method further includes achieving the high spectral resolution by assessing large Bragg angles >50°, and/or performing imaging without using large crystals thereby not introducing imaging errors.

DETAILED DESCRIPTION

The following description is provided to enable any person skilled in the art to use the described embodiments and sets forth the best mode. Various modifications, however, will remain readily apparent to those skilled in the art, since the principles relate to a multi-cone x-ray imaging Bragg crystal spectrometer. More particularly, the disclosed device is an x-ray imaging Bragg crystal spectrometer for the spectroscopy of small (point-like) x-ray sources. The disclosed x-ray imaging Bragg crystal spectrometer can easily be adapted to the experimental conditions and constraints at high-power laser facilities, such as NIF, and is especially well suited for time-resolved measurements of x-ray line spectra from high energy density plasmas with the use of streak cameras or gated strip detectors. The disclosed device can be used for the x-ray spectroscopy of any small (point-like) x-ray sources.

An important aspect of the disclosed multi-cone Bragg crystal spectrometers resides in the fact that they are x-ray imaging spectrometers with a well-defined spectral resolution for a selectable, i.e., arbitrary, range of Bragg angles. One can, therefore, expect that these multi-cone Bragg crystal spectrometers will soon replace the Hall and the von Hamos spectrometers, which are presently still the standard spectrometers for time resolved measurements of x-ray line spectra from laser-produced plasmas. In contrast to Hall's spectrometer, the disclosed multi-cone Bragg crystal spectrometers are x-ray imaging spectrometers with a well-defined spectral resolution that, e.g., can reach high values of $E/\Delta E$=10,000.

Figure 1:
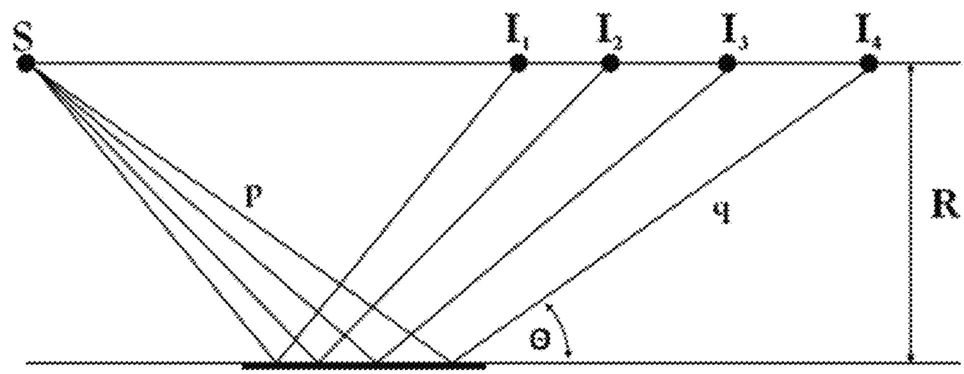
FIG. 1 depicts the geometry of the von Hamos spectrometer.
Figure 2:
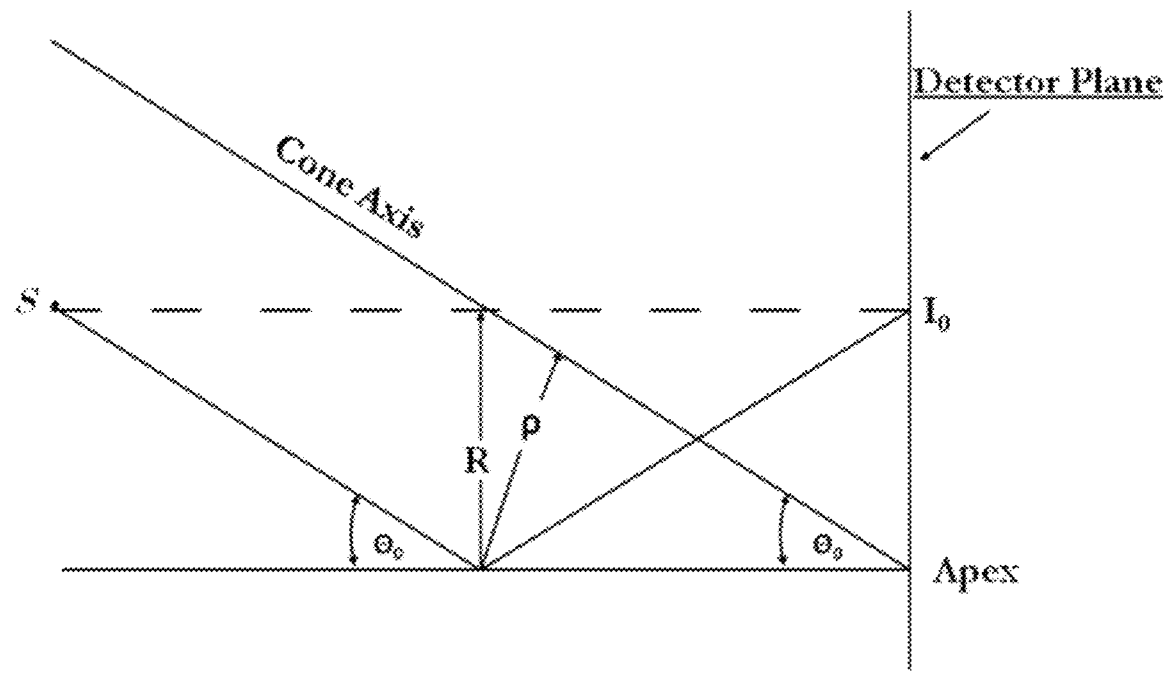
FIG. 2 depicts the geometry of Hall's conical crystal spectrograph.
Figure 3:
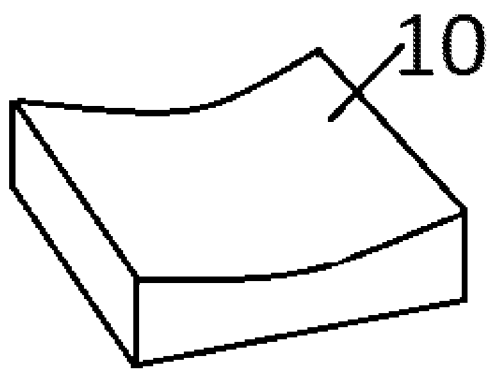
FIG. 3 depicts one embodiment of a multi-cone substrate.

FIG. 3 depicts one embodiment of a multi-cone substrate generally designated 10. In the illustrated embodiment, the substrate 10 is a 3D printed multi-cone substrate. In at least one embodiment, a 100μ thick crystal slab is attached to the multi-cone substrate 10 using glue, contact forces and the like. In the illustrated embodiment, the substrate 10 has the following parameters D=12 cm, X=58 cm, L=116 cm. In another embodiment, the crystal shapes will be produced by attaching a 100 microns thick crystal slab with the right crystal cut, to a glass substrate 10, which has been machined to the appropriate multi-cone form.

The disclosed instrument for one embodiment produces perfect images of a point source, for a selectable range of Bragg angles, along a narrow (about 200 micron wide) slit of a streak camera; while the disclosed instrument for other embodiments has the special feature that the Bragg reflected x-rays propagate on the surfaces of co-axial cylinders, such that the intersection curves of these rays with the vertical plane of a gated strip detector are segments of conical sections which extend over the full height of the detector.

Figure 4:
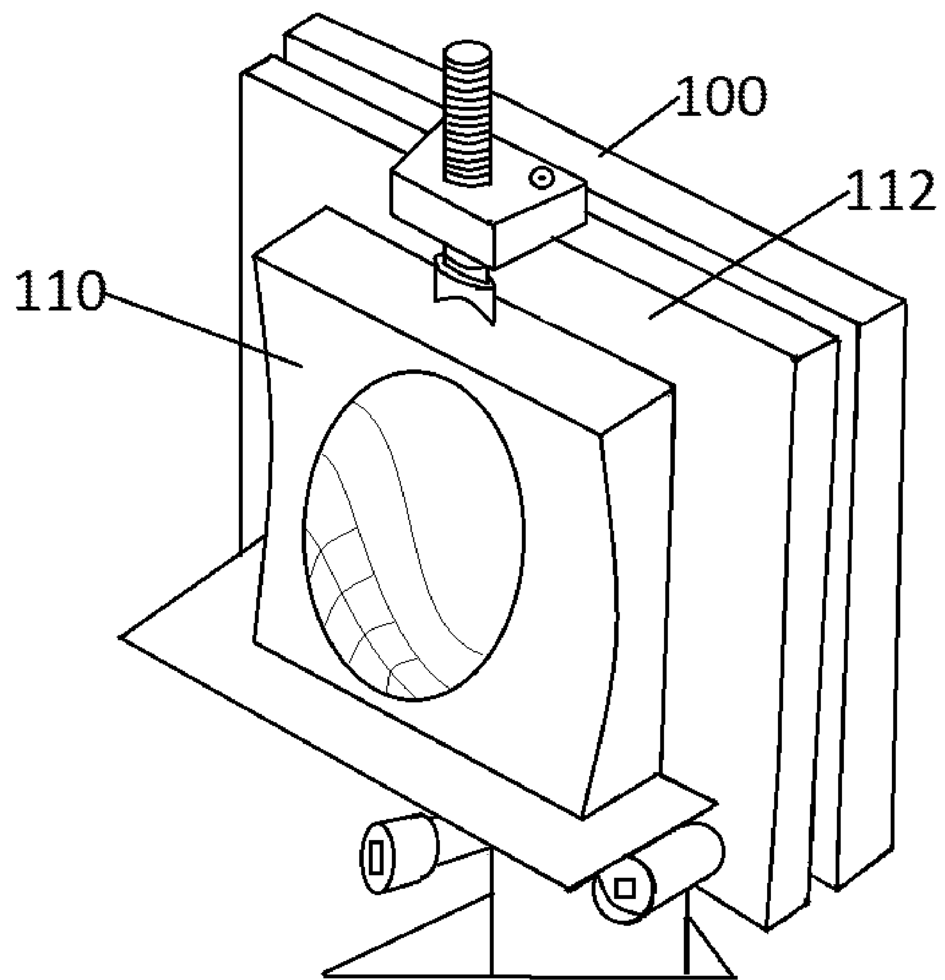
FIG. 4 depicts one embodiment of a multi-cone x-ray imaging Bragg Crystal Spectrometer.

FIG. 4 depicts one embodiment of a multi-cone X-ray imaging Bragg Crystal spectrometer, general designated 100. This embodiment depicts the multi-cone X-ray imaging Bragg Crystal spectrometer 100 with a crystal 110 having a calculated multi-cone geometry 110 (similar to substrate 10) joined to a substrate 112. More specifically, in the illustrated embodiment, the multi-cone X-ray imaging Bragg Crystal spectrometer 100 includes, as the crystal 110, a Si-110 silicon crystal, which is bonded to an ABS substrate 112 using heat-curing adhesive. The illustrated multi-cone X-ray imaging Bragg Crystal spectrometer 100 measures 6 cm×6 cm with x)=29 cm, D=12 cm and L=116 cm.

Figure 5:
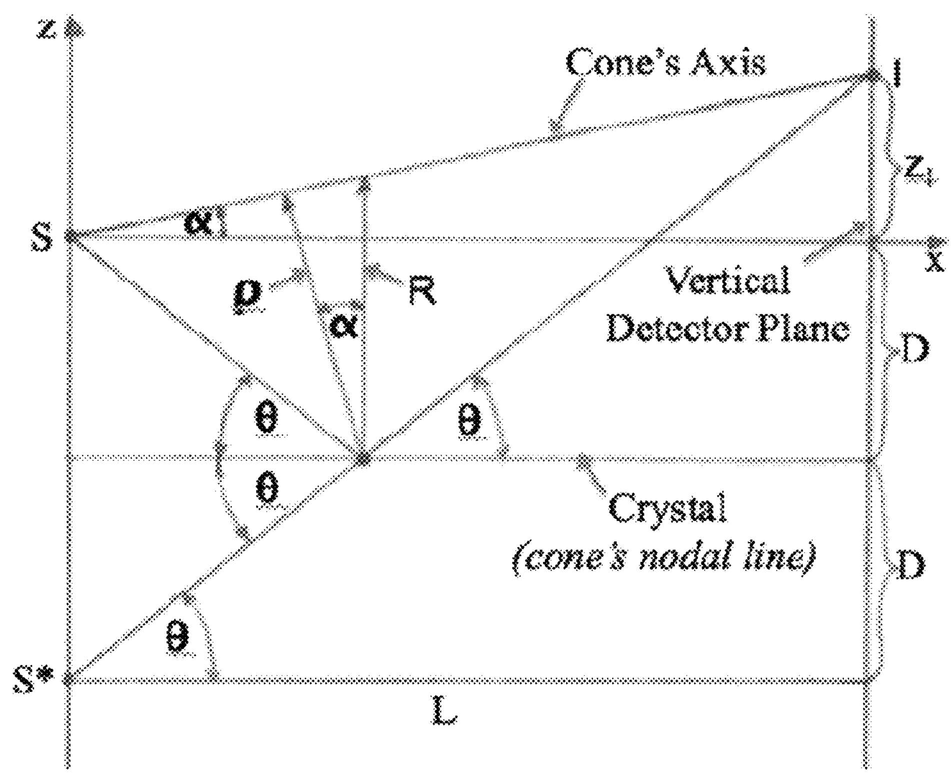
FIG. 5 illustrates a conical crystal spectrometer.

FIG. 5 illustrates a conical crystal spectrometer. FIG. 5 shows a single cone with the half-aperture angle $\alpha$ and the rays for the particular Bragg angle $\Theta$, for which an image I of the source S is obtained on a vertical detector plane. The source S and its image I are both on the cone's axis. A nodal line of the conical crystal surface is parallel to the x-axis and at a distance D below the x-axis. Also shown is the mirror image S* of the source S, from which the reflected ray seems to emanate. The ray pattern is symmetric with respect to rotations about the cone's axis, with the radius $\rho=R\cos(\alpha)$, where R is normal to the cone's nodal line and the bisector of the angle between the incident and reflected rays. L is the distance of the source from the vertical detector plane.

From FIG. 5, it may be inferred that:

$$\tan(\theta)=D/x \quad (1)$$

$$\tan(\theta)(2D+z_I)/L \quad (2)$$

From equations (1) and (2):

$$D/x=(2D+z_I)/L \quad (3) \text{ or}$$

$$z_I/L=D/L(1/x/L-2)=\tan(\alpha) \quad (3')$$

$$R=D+x\tan(\alpha)=D+xD/L(1/x/L-2) \quad (4)$$

$$\rho/L=R/L\cos(\alpha) \quad (5)$$

For measurements with a streak camera it is desirable that all the images for different wavelengths, $\lambda$, or Bragg angles, $\Theta$, of a point-like (laser produced) plasma source fall onto the narrow (about 200 micron wide) entrance slit of the streak camera, which—because of experimental constraints—must be perpendicular to the crystal surface. With a single-cone crystal surface, this requirement is satisfied for only ONE but not ALL Bragg angles, as is evident from FIG. 5.

It is possible to fulfill this requirement for all Bragg angles $\Theta$ by using a special crystal shape, which can be generated by superimposing multiple cones with different aperture angles $\alpha$ on a common nodal line, where each cone is assigned to certain Bragg angle $\Theta$. This crystal shape is determined by the equations (1) through (5), whereby particular values of $\Theta$, $\alpha$, $\rho$, and R are assigned to each x-value on the nodal line in the crystal surface. These equations are given in a convenient form, where x, $\rho$, R, and D are normalized to L, the distance of the source from the vertical detector plane. The ratio D/L is a free parameter, whose value determines the layout of the spectrometer.

Figure 6:
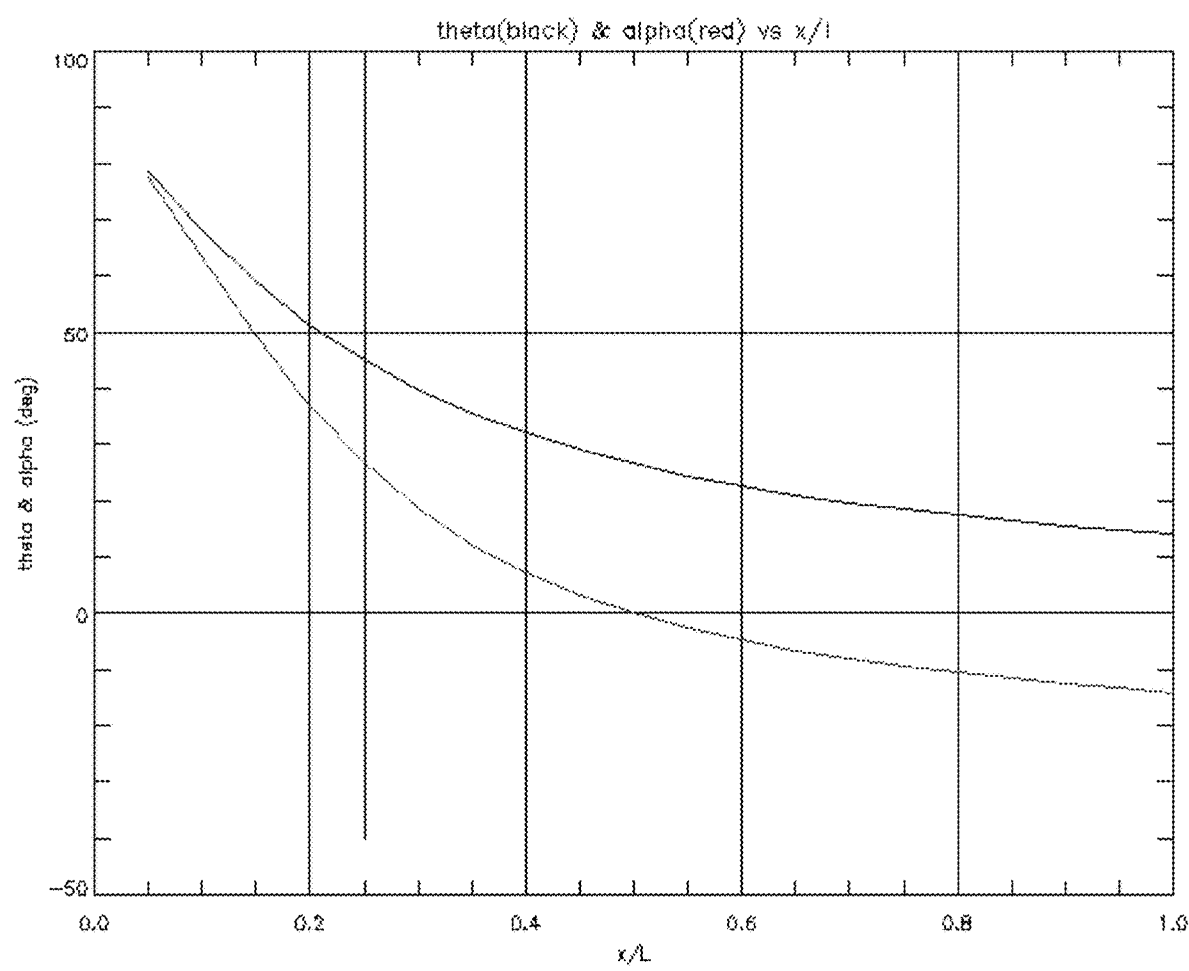
FIG. 6 illustrates a Bragg angle Θ and half-aperture angle α of the cone.

FIG. 6 illustrates the Bragg angle $\Theta$ and half-aperture angle $\alpha$ of the cone, which according to equations (1) and (3') are associated with a position x/L on the cones' common nodal line. The blue line indicates the x/L-position, where the radius $\rho$ has a maximum—see FIG. 7.

Figure 7:
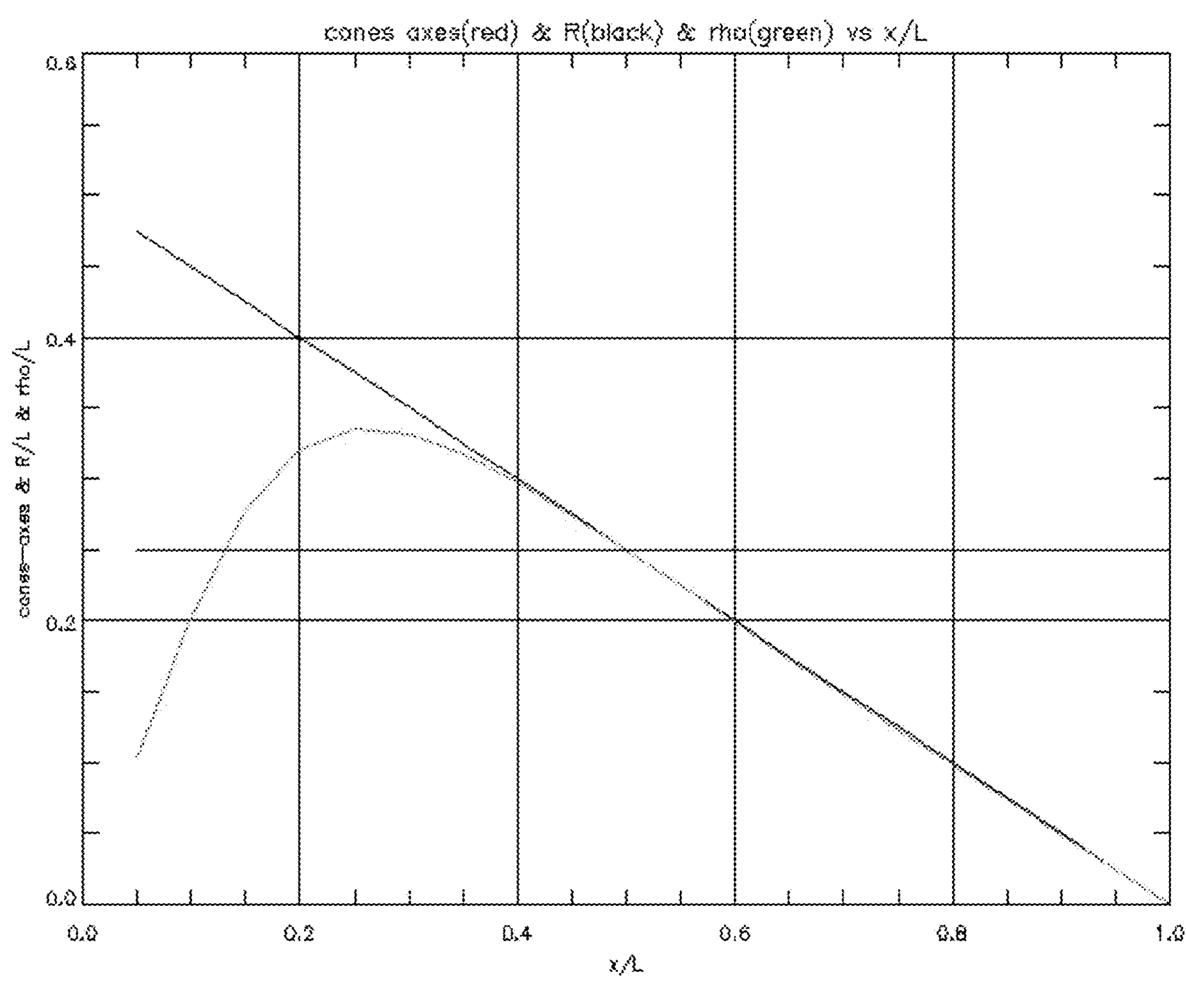
FIG. 7 depicts normalized values R/L and ρ/L as a function of the position x/L on the cones' common nodal line.

FIG. 7 depicts normalized values R/L and $\rho$/L as a function of the position x/L on the cones' common nodal line, according to equations (4') and (5). Here, R/L is the distance of the point at x/L on the nodal line from the axis of the cone with the half-aperture angle □ that is associated with the position x/L—see ρ5; and ρ/L=R/L cos(α) is the radius of curvature of this cone at the position x/L. The maximum: ρ/L-max=0.335945 is at x/L=0.26. In the neighborhood of this maximum, the radius of curvature ρ/L varies only slowly with x/L. The blue line marks the value of the parameter D/L=0.25 that was chosen for this case.

Figure 8:
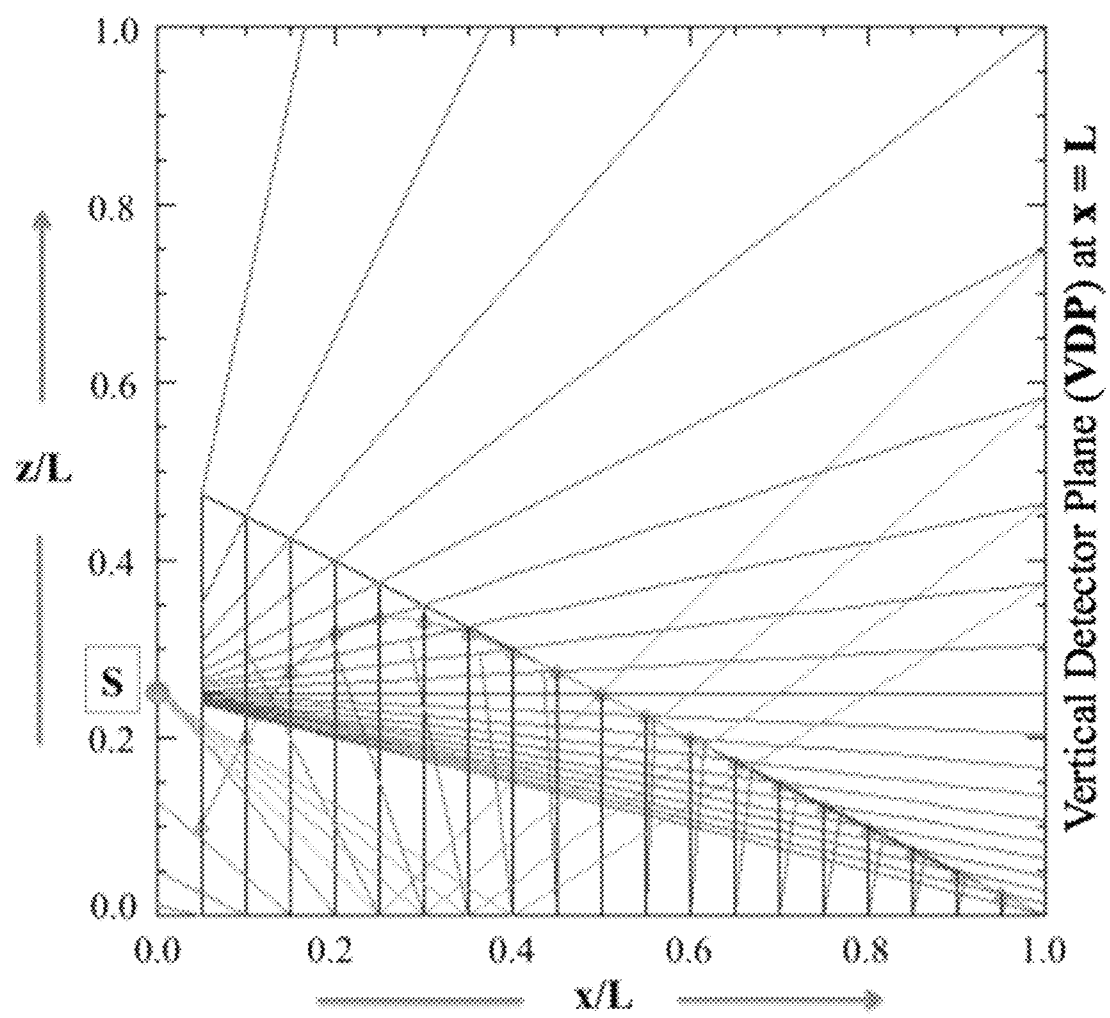
FIG. 8 illustrates the axes of the cones, whose aperture half-angles α and radii of curvature ρ/L are associated with the 20 x/L-values chosen for the present calculations.

FIG. 8 depicts an embodiment of the x-ray point source (S) and vertical detector plane (VDP) at the distance x=L in the x,z-plane of an x,y,z-coordinate system. In FIG. 8 the red lines represent the axes of the 20 cones, whose aperture half-angles α and radii of curvature ρ/L are associated with the x/L-values for the 20 points of incidence that were chosen for the present calculations. The cones' axes pass through the point source at (x/L=0; D/L=0.25). The (black) vertical line segments at each of 20 x/L-values represent the values of R/L that are given by equation (4'). The green curve represents the magnitude of ρ=R/L cos(α) at each x/L-value and the tilted green lines represent both, the magnitude and direction, of ρ/L at each x/L-value. The light blue lines represent the incident and reflected x-rays at the selected x/L-values: x/L=0.2; 0.3; and 0.4. Note that the reflected rays intersect the corresponding cone axes in the vertical deflector place (VDP).

Figure 9:
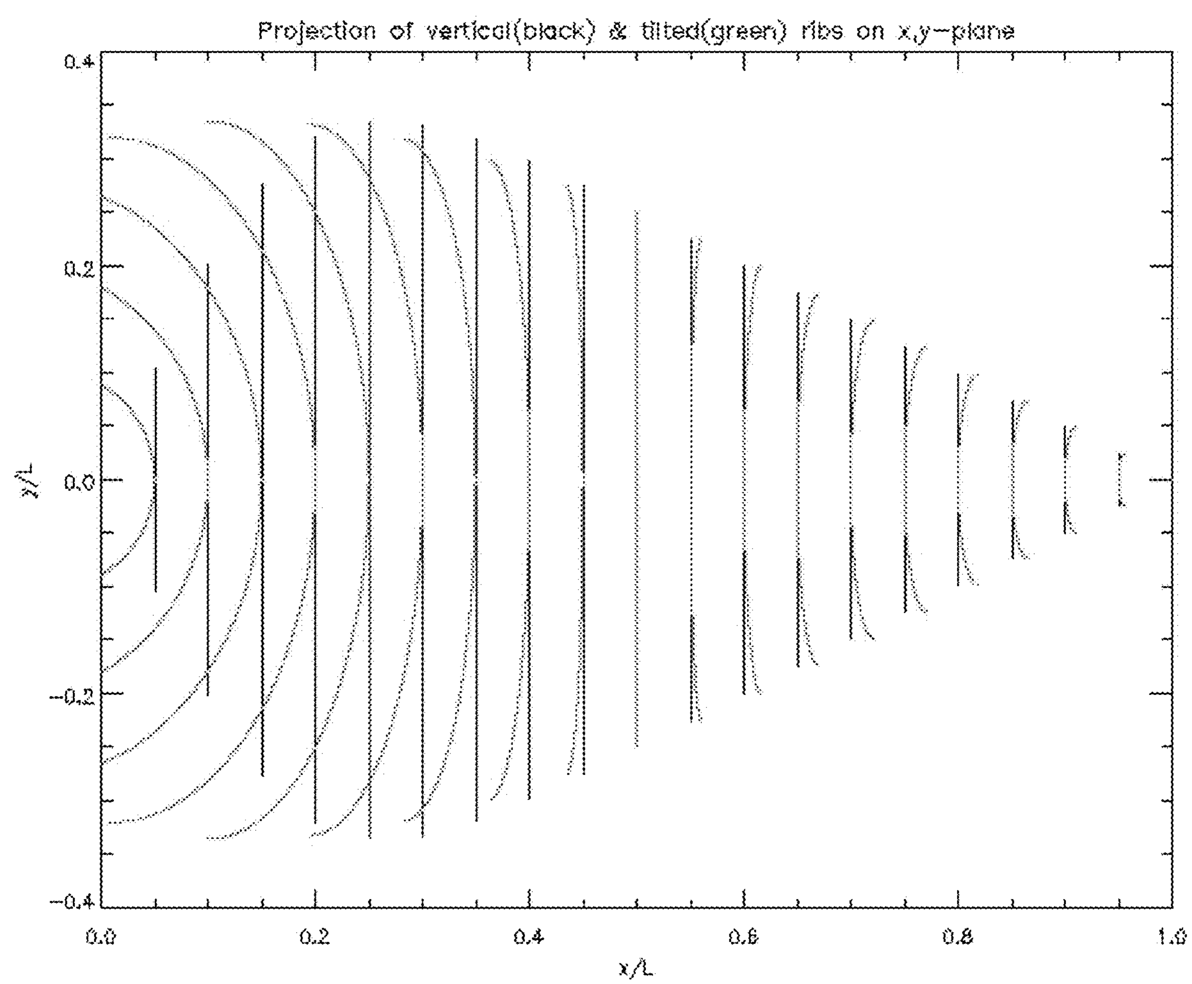
FIG. 9 illustrates projection of the vertical and tilted semicircles on the x, y plane.

FIG. 9 illustrates projection of the 20 vertical (black) and tilted (green) semicircles on the x, y plane. The red line is the projection of the vertical semicircle with the maximum radius: $\rho=\rho_{max}$.

Figure 10:
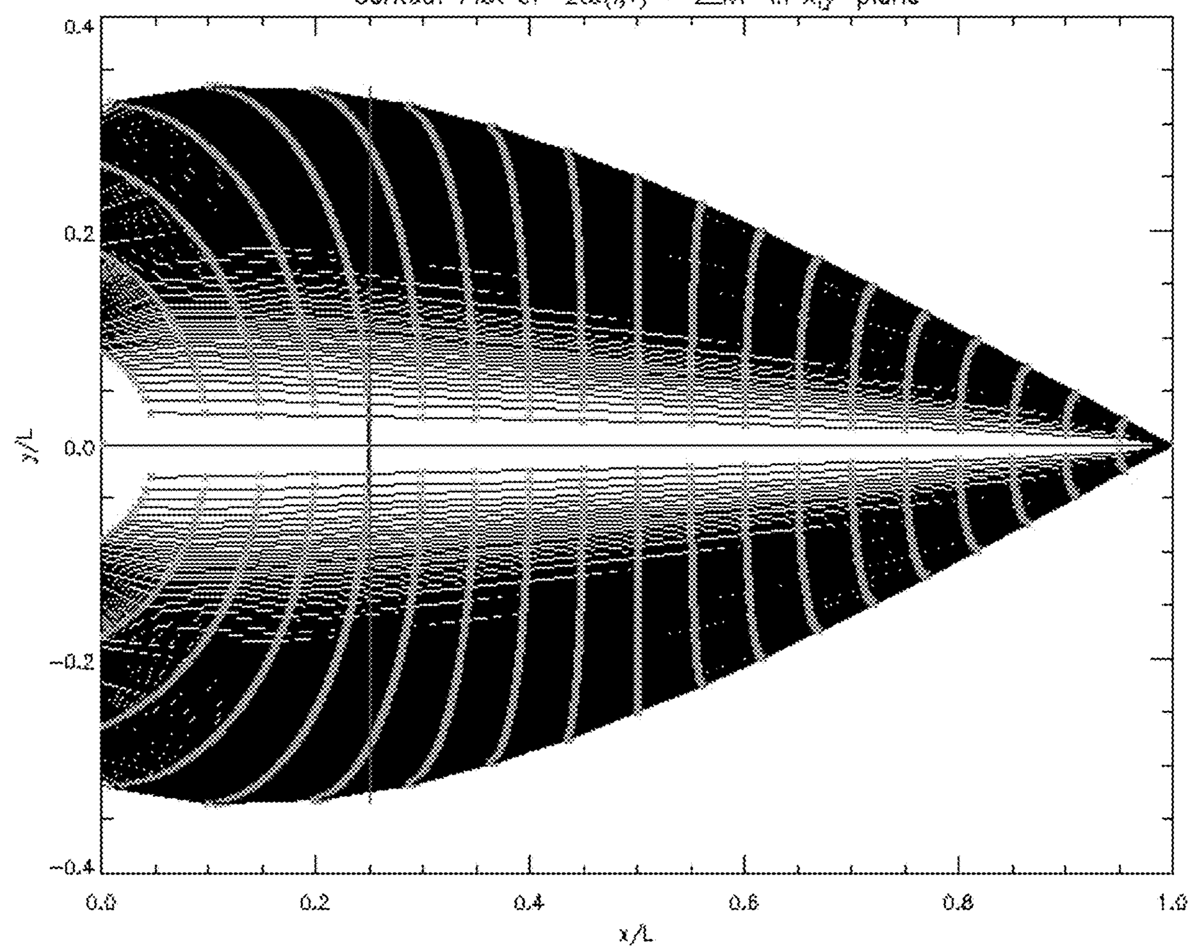
FIG. 10 illustrates a contour-plot of the 'boat structure'.

FIG. 10 illustrates a contour-plot of the 'boat structure'. The height increment between adjacent contour lines is Δz=1 mm. The green points are the intersection points of the contour lines with the projections of the tilted semicircles.

Figure 11A:
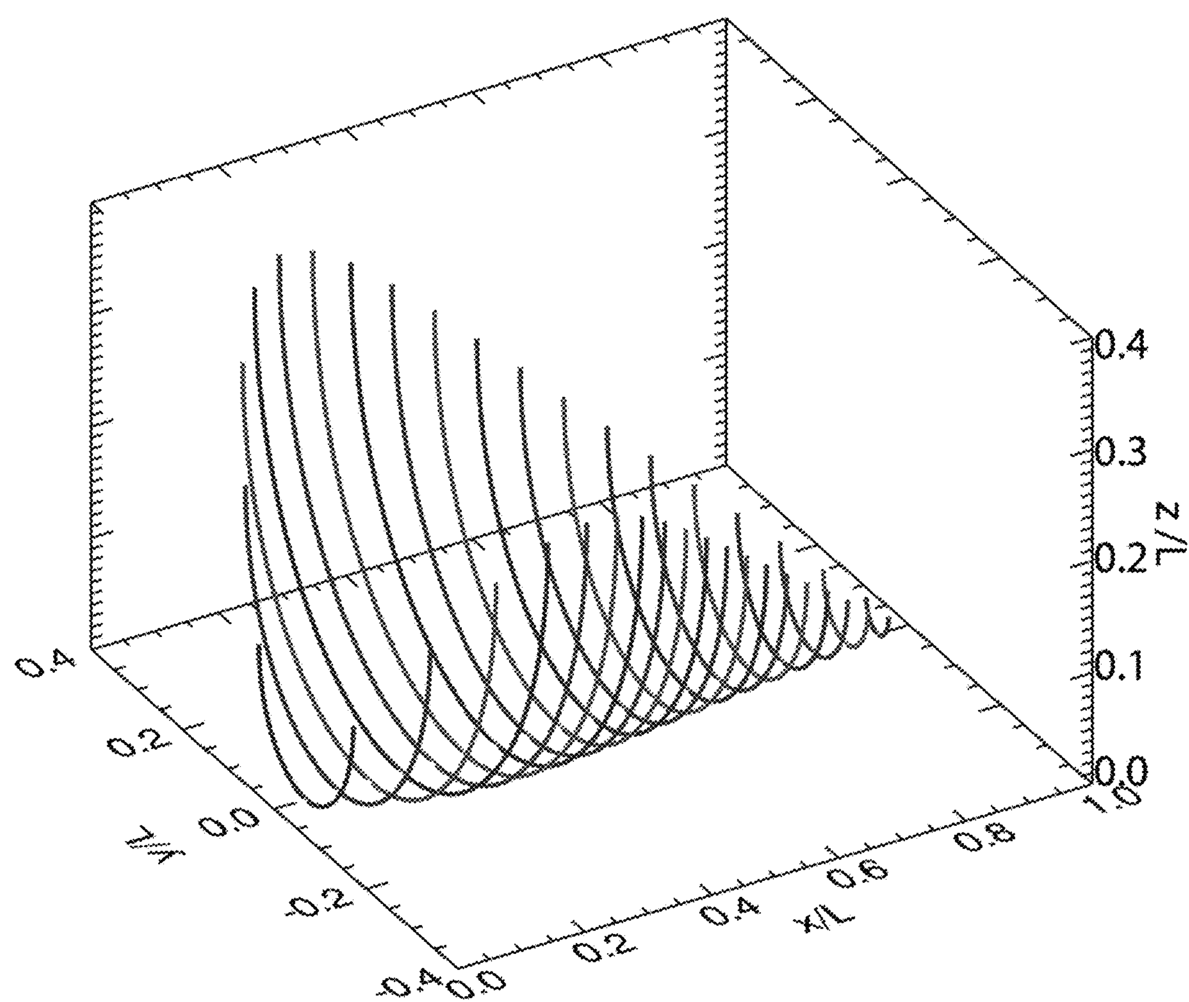
FIG. 11A illustrates 3D-Plot of the vertical ribs.
Figure 11B:
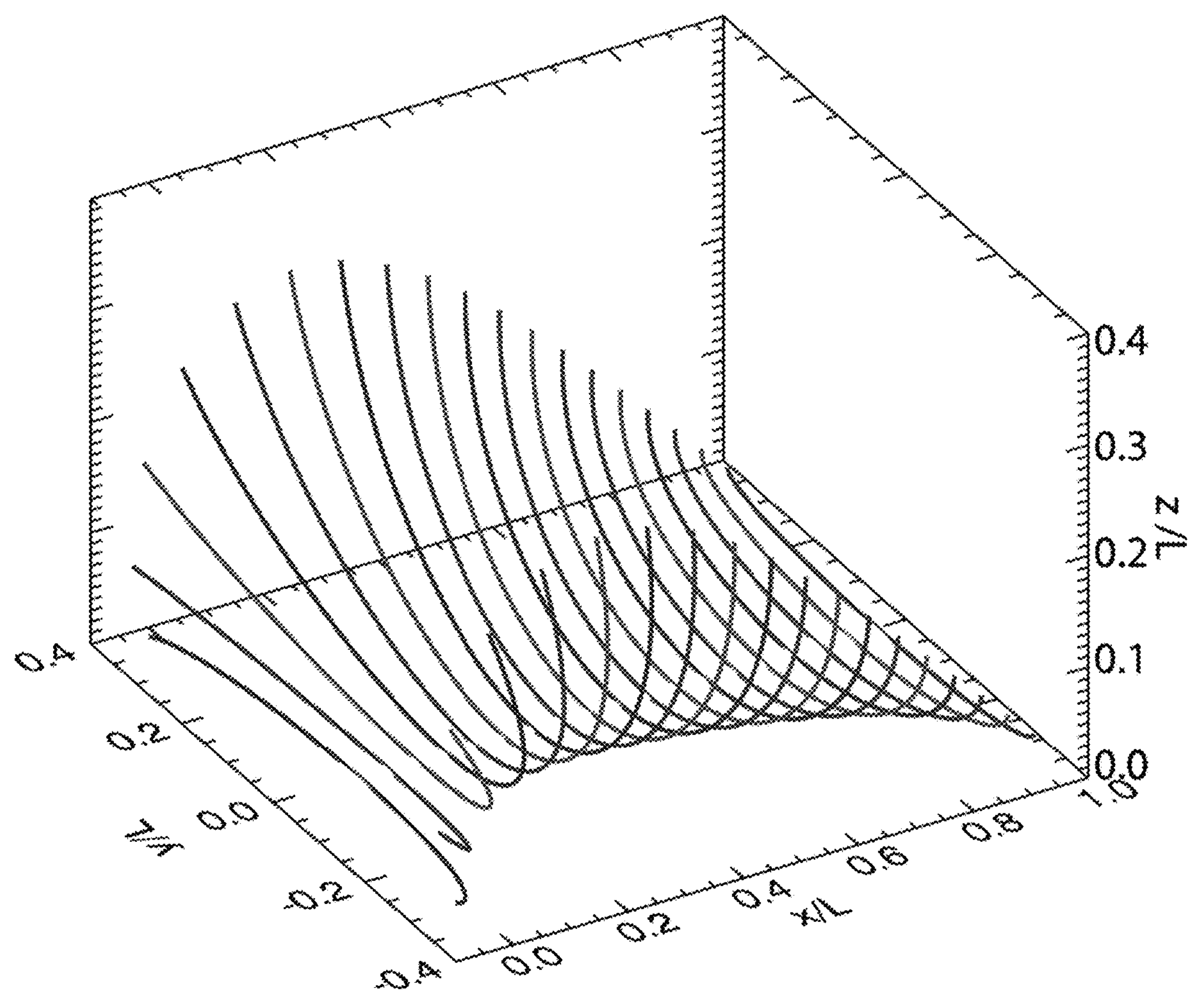
FIG. 11B illustrates 3D-Plot of the tilted ribs.
Figure 11C:
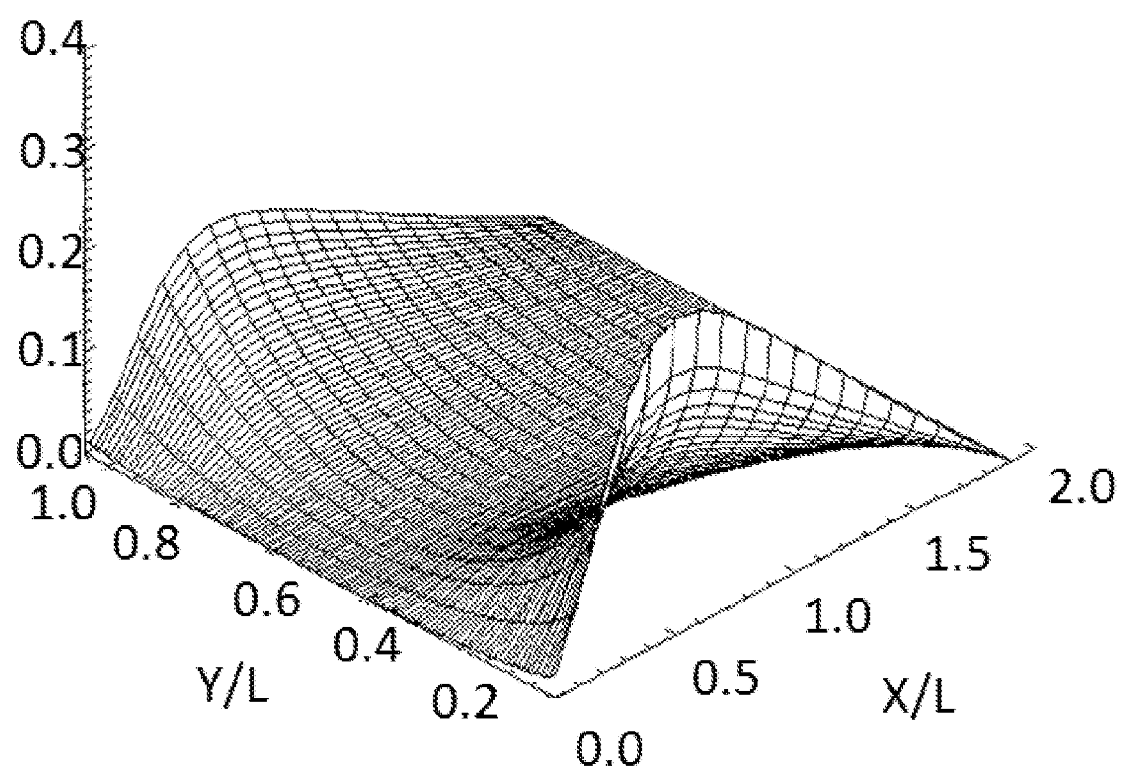
FIG. 11C illustrates a surface plot of the 'boat structure'.

FIG. 11A illustrates 3D-Plot of the vertical ribs. FIG. 11B illustrates 3D-Plot of the tilted ribs, which form the 'boat structure', representing the form of the crystal substrate and the crystal surface; and FIG. 11C illustrates a surface plot of the 'boat structure' representing the form of the crystal substrate and the crystal surface.

The standard spectrometer, which is presently being used for time-resolved measurements of x-ray line spectra with a streak camera is Hall's 'single-cone' spectrometer, which was introduced 1984. This instrument is deeply flawed and its spectral resolution is not even defined, since it is not and imaging spectrometer. The procedure to select the appropriate multi-cone crystal for a spectrometer is as follows: Step1—The source-detector distance L and the parameter D/L are determined from the experimental conditions; Step2—The required length of the crystal, its location between the source and detector plane, the associated cone aperture angles $\alpha_i$ and cone radii pi are determined from FIGS. 5 and 6, according to the desired range of Bragg angles Θ; and Step3—The height of the crystal, i.e., the lengths of the semicircle segments, can be freely chosen without any deterioration of the imaging properties, since—contrary to Hall's spectrometer—this multi-cone spectrometer is an x-ray imaging spectrometer.

For measurements with a Gated Strip Detector, whose sensitive area is typically 2.5×2.5 $cm^2$, it is desirable that each spectral line covers the entire height (about 2.5 cm) of the detector.

This may be achieved with a special 'multi-cone crystal', where the half-angle α of each cone is equal to the associated Bragg angle Θ, i. e. α=θ. The Bragg reflected x-rays are then always parallel to the axes of the associated cones; or—in other words—the intersection points of the reflected rays with the associated cone axes are then at infinity. And, since the ray patterns are rotationally symmetric about the axes of the cones, the reflected rays propagate on the surfaces of cylinders, whose axes are identical with the cones' axes. The intersection points of the reflected rays, for each Bragg angle Θ, are therefore located on a certain circle in a vertically oriented gated strip detector plane. These circular segments will extend over the entire height of the detector if the height of the crystal is equal to the height of the detector. The 'multi-cone crystal' structure for this special application is described by the following simplified set of equations:

$$\tan(\theta)=\tan(\alpha)=D/x \quad (6)$$

$$R=D+x\tan(\alpha)=2D \quad (7)$$

$$R/L=2D/L \quad (7')$$

$$\rho/L=R/L\cos(\alpha)=R/L\cos(\theta)=2D/L\cos(\theta) \quad (8)$$

Figure 12:
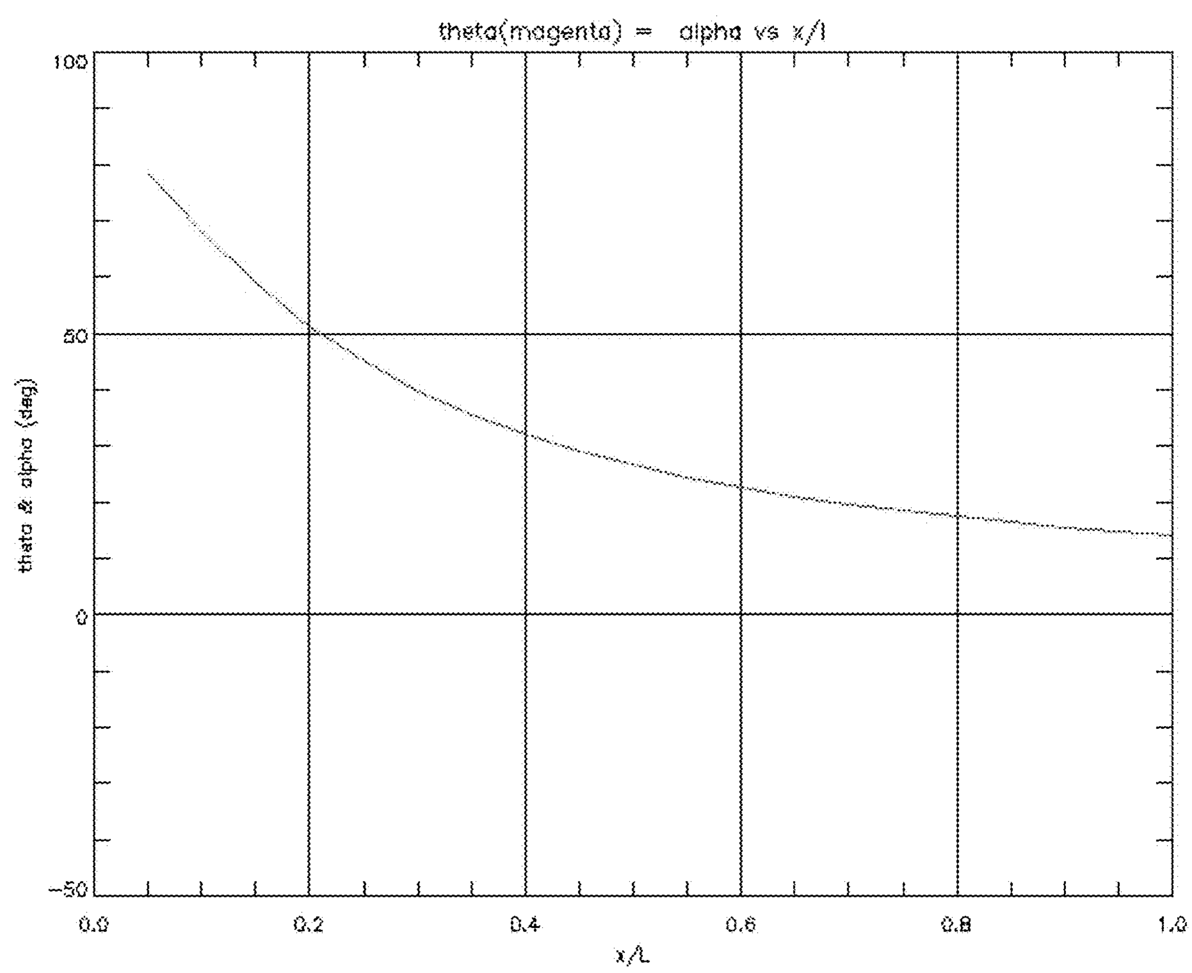
FIG. 12 illustrates the Bragg angle Θ, which is equal to the half-aperture angle α of the cone.

FIG. 12 illustrates the Bragg angle Θ, which is equal to the half-aperture angle α of the cone, as a function of the position x/L on the cones' common nodal line according to equations. (6) and (7'). The blue line indicates the x/L-position, where the radius ρ has a maximum—see FIG. 13.

Figure 13:
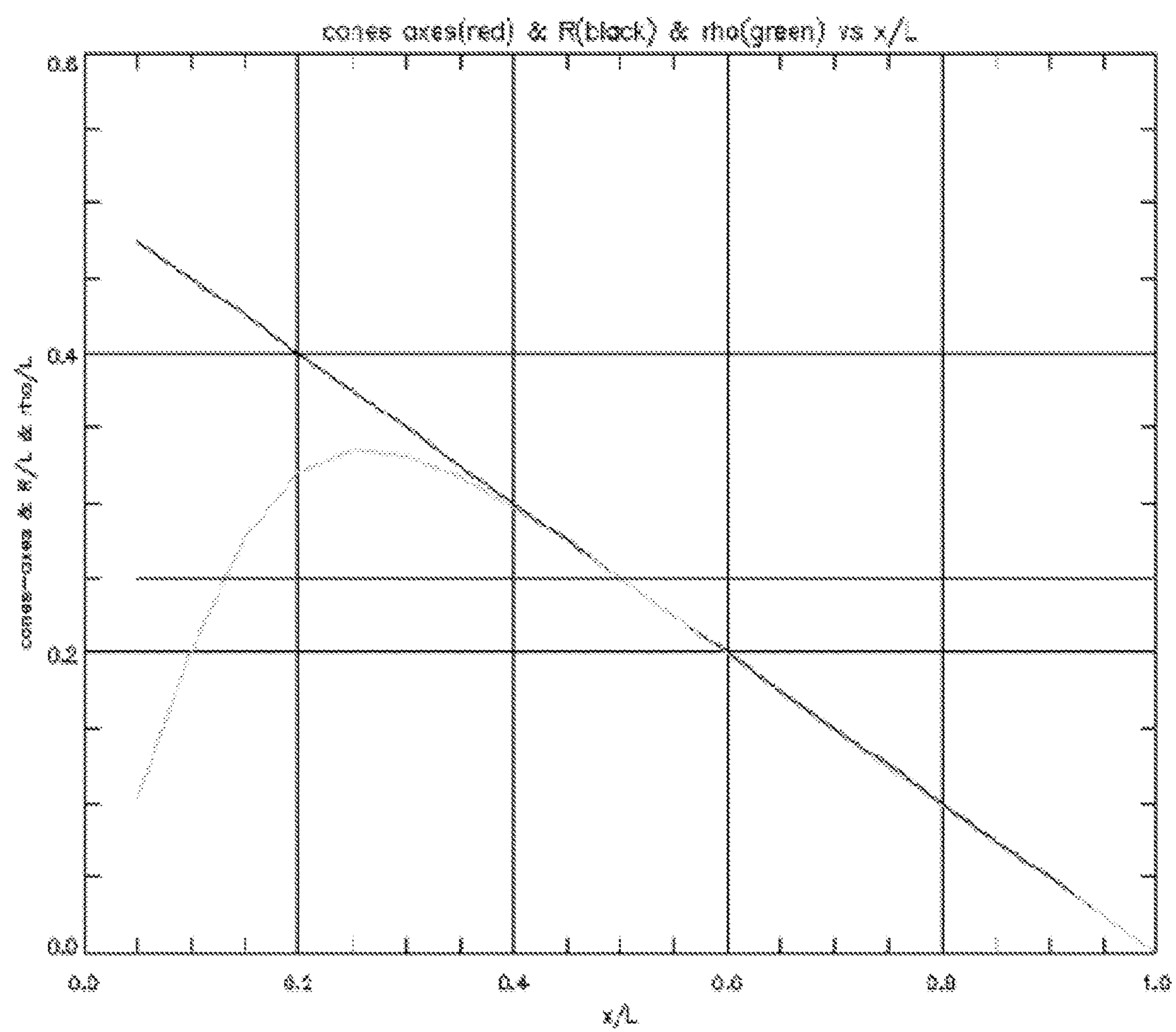
FIG. 13 illustrates normalized values R/L and ρ/L as a function of the position x/L on the cones common nodal line.

In FIG. 13 normalized values R/L and ρ/L as a function of the position x/L on the cones common nodal line, according to equations (7') and (8). Here, R/L is the distance of the point at x/L on the nodal line from the axis of the cone with the half-aperture angle α that is associated with the position x/L—see FIG. 5; and ρ/L=R/L cos(α) is the radius of curvature of this cone at the position x/L. The blue line marks the value of the parameter D/L=0.25 that was chosen for this case.

Figure 14:
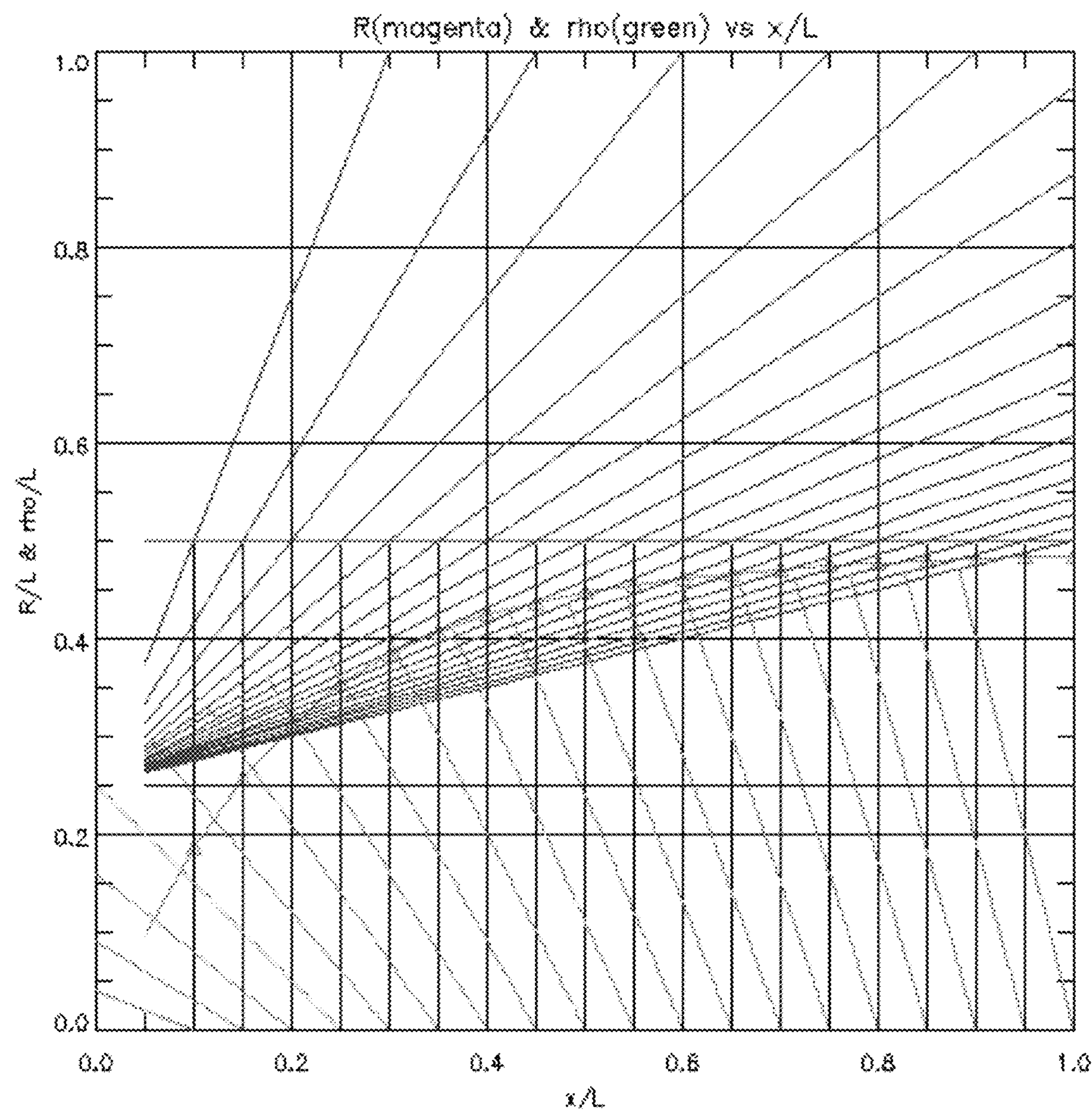
FIG. 14 illustrates the axes of the cones, whose aperture half-angles α and radii of curvature ρ/L are associated with the 20 x/L-values that were chosen for the present calculations.

FIG. 14 illustrates the red lines represent the axes of the 20 cones, whose aperture half-angles α and radii of curvature ρ/L are associated with the 20 x/L-values that were chosen for the present calculations. The cones' axes pass through the point source at (x/L=0; z/L=D/L=0.25). The (black) vertical line segments at each of 20 x/L-values represent the values of R/L that are given by eq. (2'). The green curve represents the magnitude of ρ=R/L cos(α) at each x/L-value and the tilted green lines represent both the magnitude and direction, of ρ/L at each x/L-value.

Figure 15:
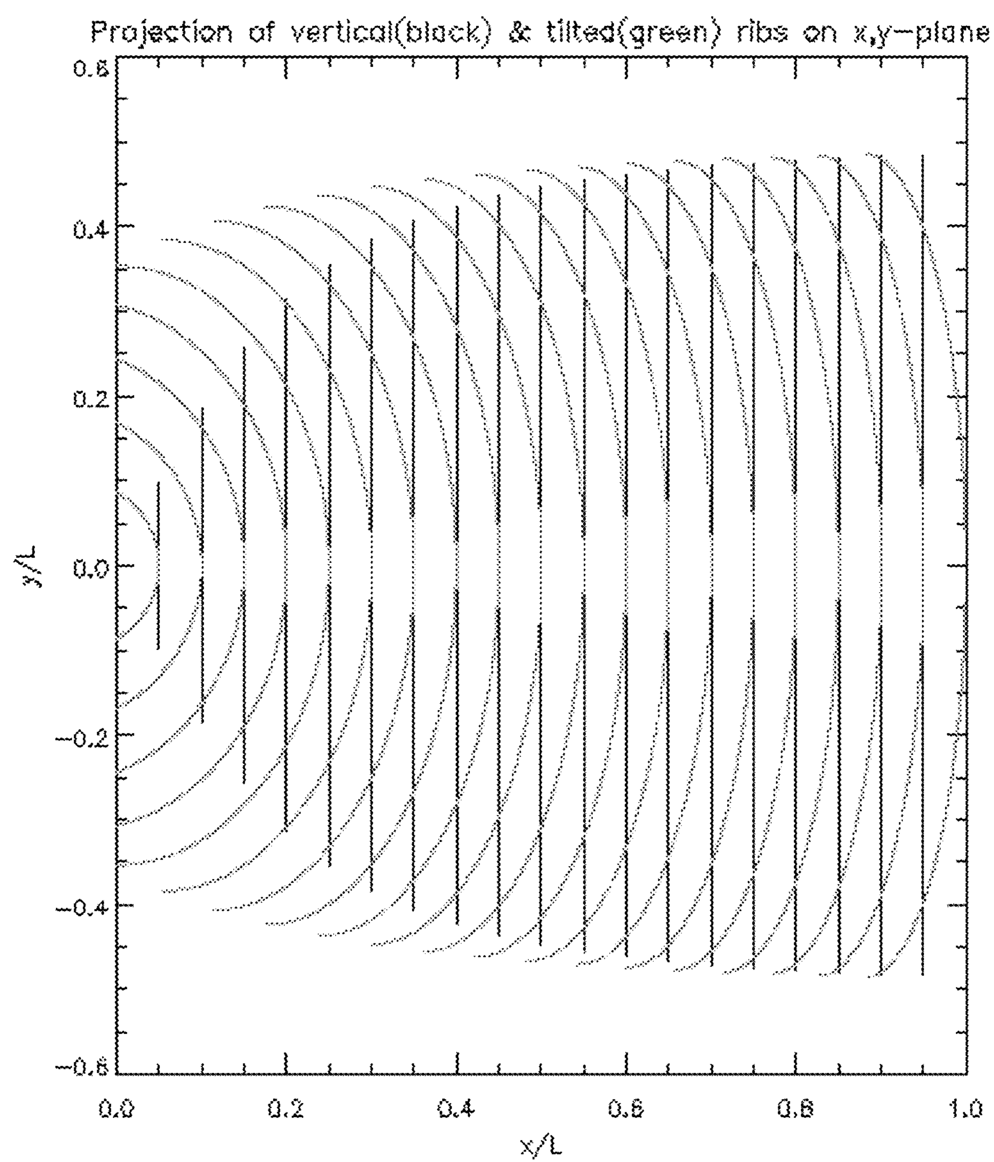
FIG. 15 illustrates the projection of the 20 vertical (lack) and tilted (green) semicircles on the x, y plane.

FIG. 15 illustrates the projection of the 20 vertical (lack) and tilted (green) semicircles on the x, y plane.

Figure 16:
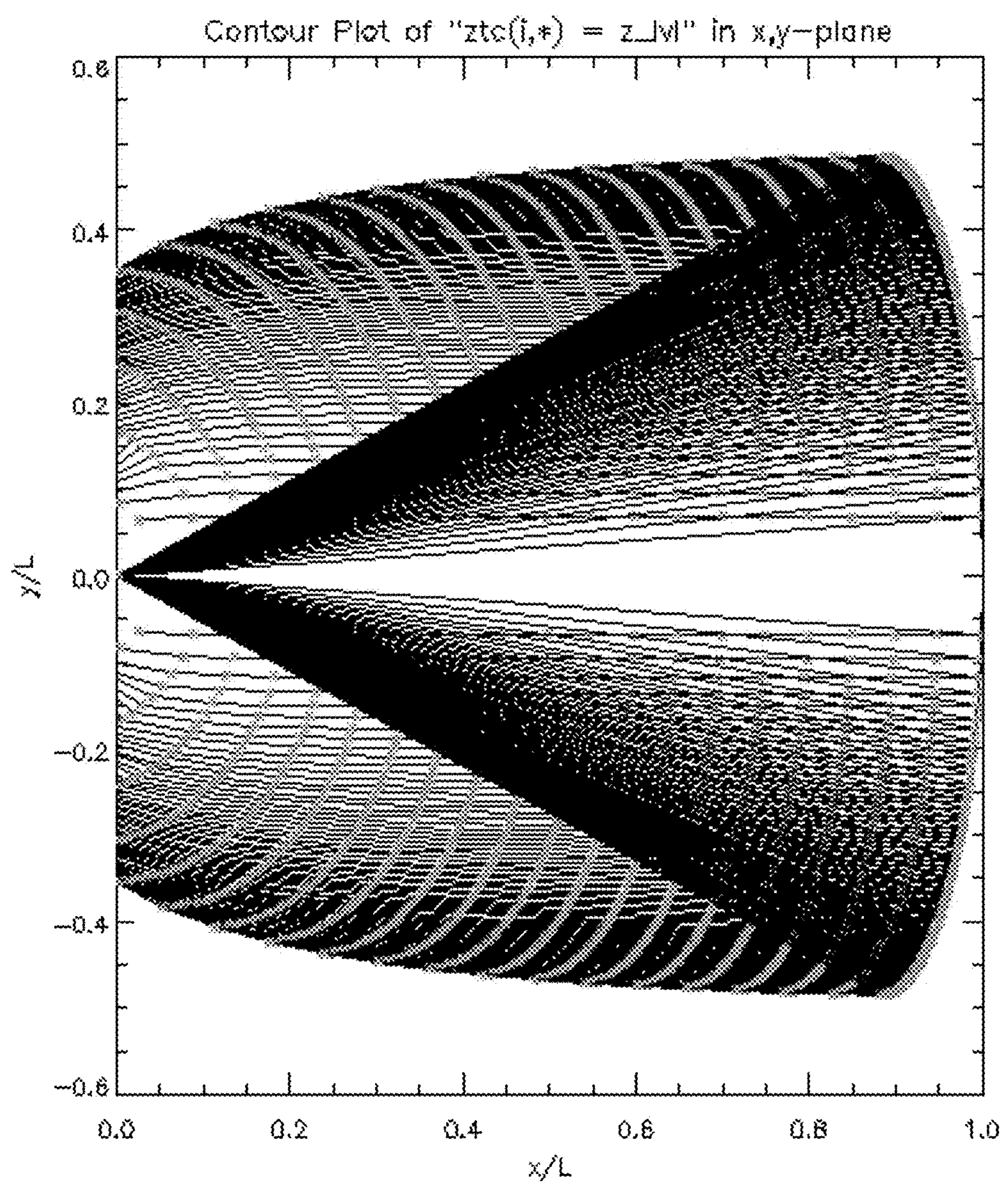
FIG. 16 illustrates contour-plot of the 'boat structure'.

FIG. 16 illustrates contour-plot of the 'boat structure'. The height increment between adjacent contour lines is Δz=4.70588 mm. The green points are the intersection points of the contour lines with the projections of the tilted semicircles.

Figure 17:
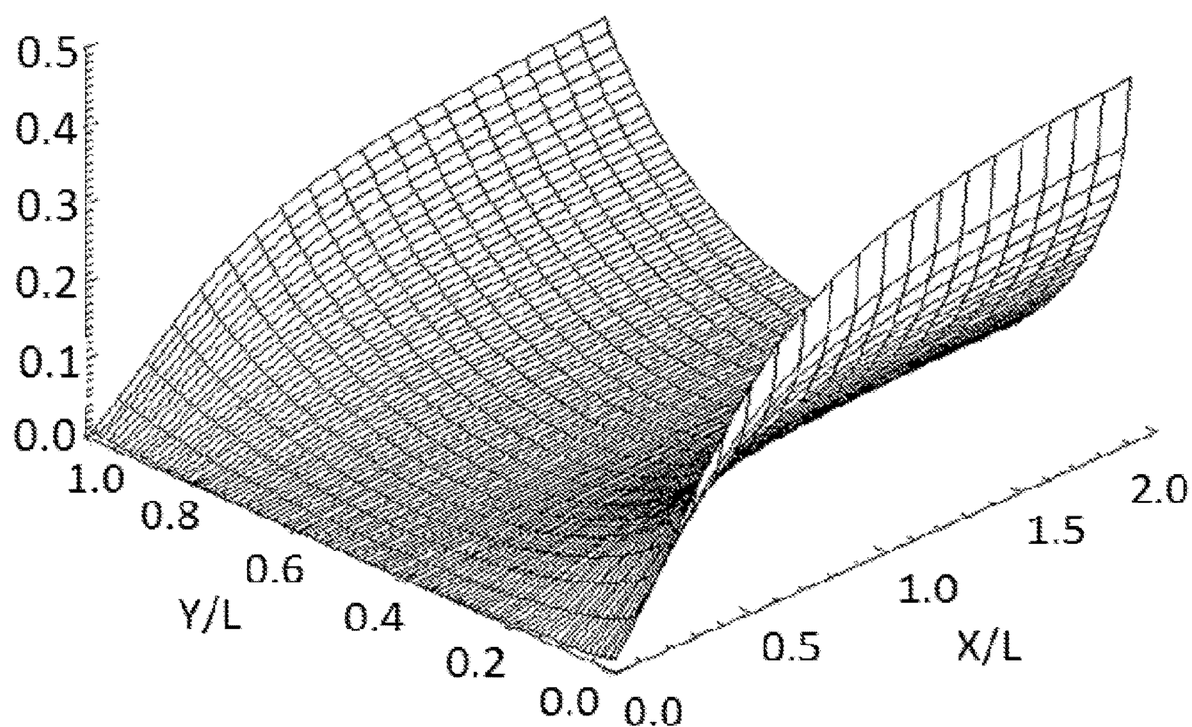
FIG. 17 illustrates the surface plot of the 'boat structure' representing the form of the crystal substrate and the crystal surface.

FIG. 17 illustrates the surface plot of the 'boat structure' representing the form of the crystal substrate and the crystal surface.

Figure 18:
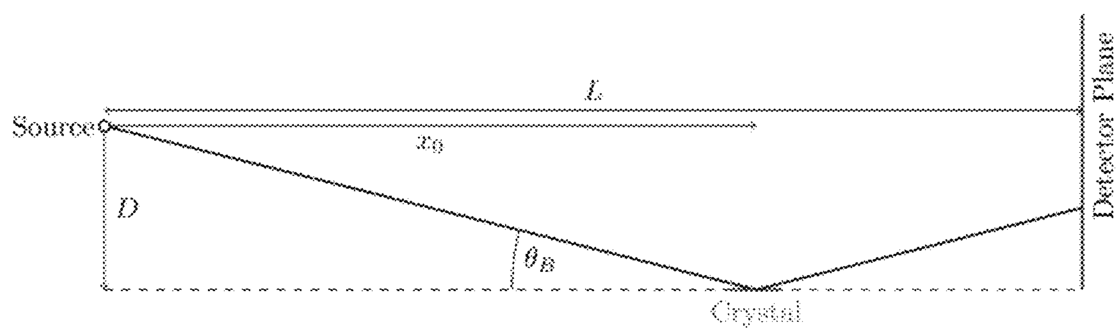
FIG. 18 illustrates an x-ray test illustrating improved spectral and spatial focus.
Figure 19:
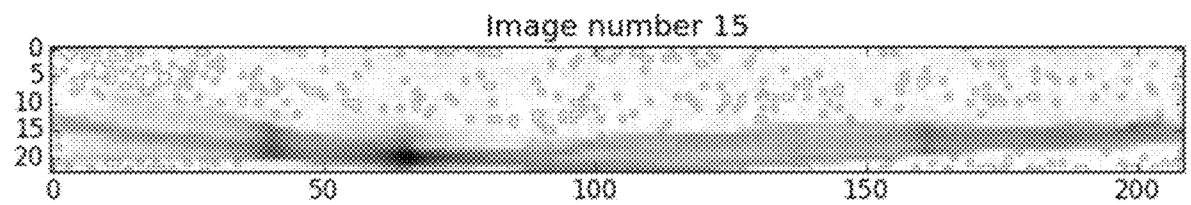
FIG. 19 illustrates improved spectral and spatial focus.
Figure 20:
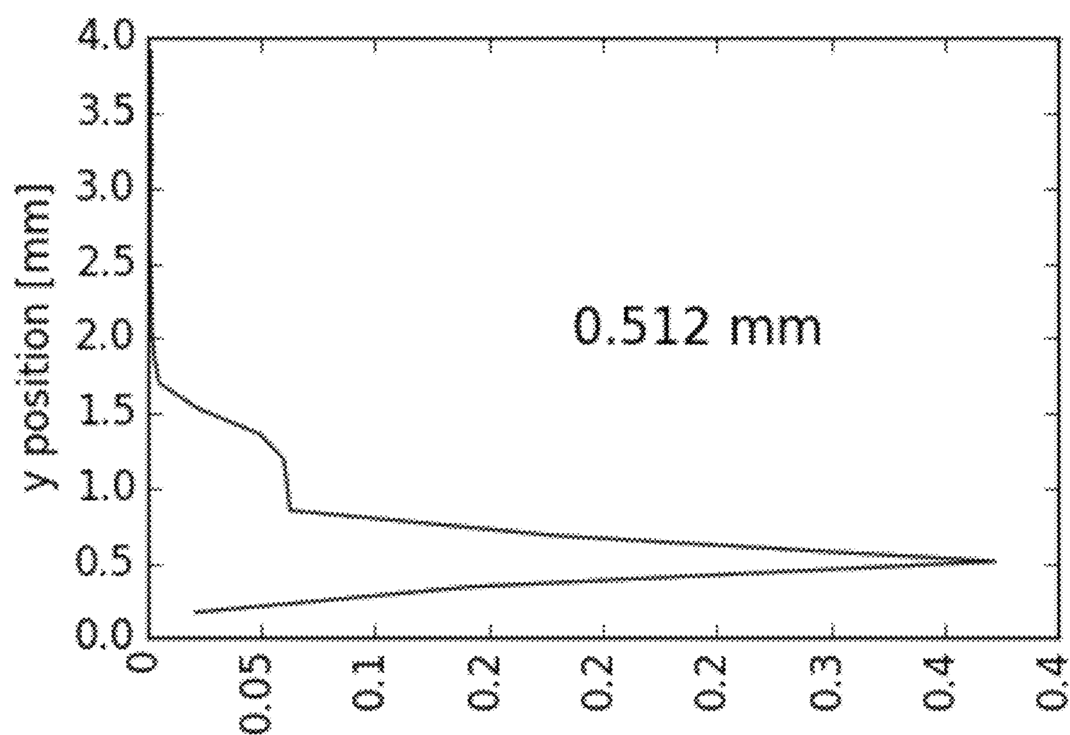
FIG. 20 illustrates the average focused width.
Figure 21:
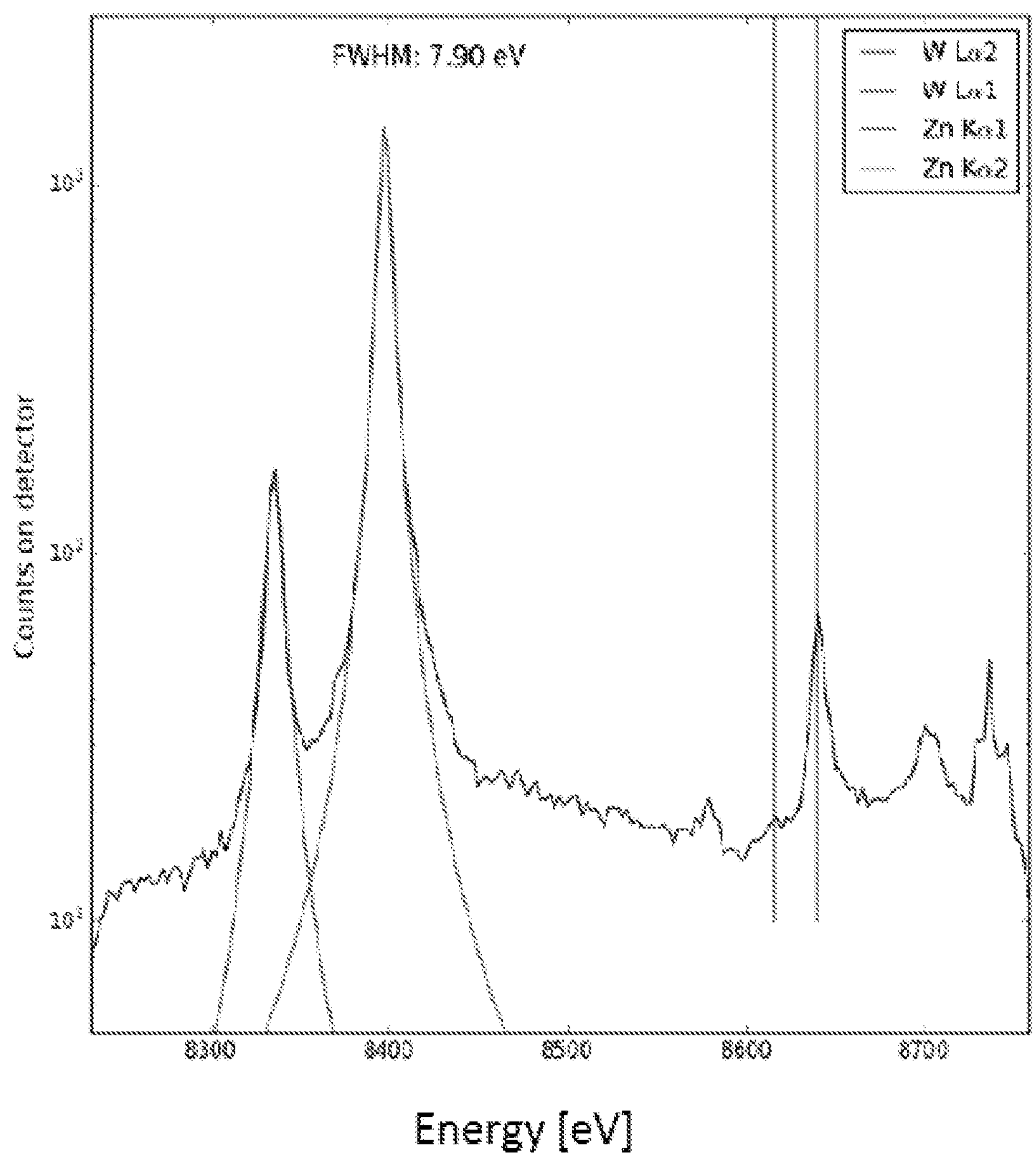
FIG. 21 illustrates an example spectrum of a tungsten micro-fucus ray source.
Figure 22:
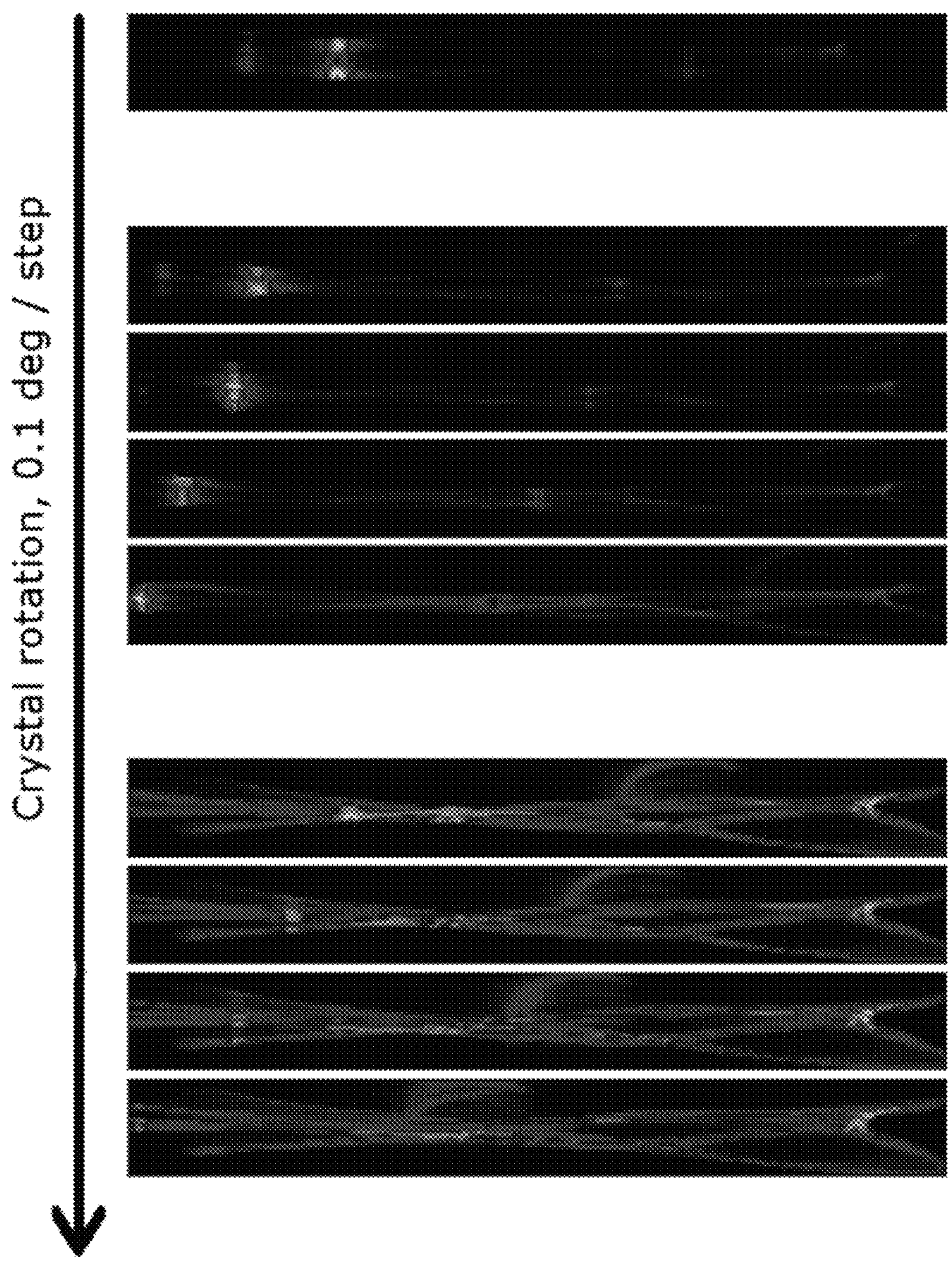
FIG. 22 illustrates a scan of rotations of the multicone crystal illustrating the focus of an aligned crystal versus the eventual misalignment at incorrect angles of incidence.

FIG. 18 illustrates an x-ray test illustrating improved spectral and spatial focus. FIG. 19 illustrates improved spectral and spatial focus. FIG. 20 illustrates the average focused width. FIG. 21 illustrates an example spectrum of a tungsten micro-focus ray source; and FIG. 22 illustrates a scan of rotations of the multicone crystal illustrating the focus of an aligned crystal versus the eventual misalignment at incorrect angles of incidence.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

What is claimed is:

1. An X-ray imaging spectrometer with a well-defined spectral resolution for each wavelength in a spectral range of interest, said X-ray imaging spectrometer comprising:

an X-ray detector;

an X-ray source;

a glass substrate machined to a multi-cone form;

a crystal slab attached to the glass substrate, wherein said multi-cone form is generated by superimposing a plurality of cones with different aperture angles on a common nodal line, wherein said multi-cone form provides a rotational symmetry of a ray pattern, wherein said crystal slab reflects X-rays onto said X-ray detector, wherein said reflected X-rays intersects a corresponding cone axis.

2. The X-ray imaging spectrometer of claim 1, wherein the X-ray detector comprises a streak camera.

3. The X-ray imaging spectrometer of claim 1, wherein the X-ray detector comprises a gated strip detector.

4. The X-ray imaging spectrometer of claim 1, wherein said substrate comprises a 3D printed material having a multi-cone form.

5. A method for imaging each wavelength in a spectral range of interest of small X-ray sources employing an X-ray imaging spectrometer;

the X-ray imaging spectrometer comprising:

a glass substrate machined to a multi-cone form;

a thin crystal slab attached to the glass substrate; and a point-like X-ray source, the method comprising:

calculating a multi-cone geometry, wherein said multi-cone geometry is determined by superimposing a plurality of cones with different aperture angles on a common nodal line, wherein said plurality of cones includes a cone for each Bragg angle;

machining said glass substrate to have said multi-cone geometry;

providing a rotational symmetry of a ray pattern; and imaging each wavelength in a spectral range of interest.

6. The method of claim 5, wherein the thin crystal slab provides a well-defined and very large spectral resolution.

7. The method of claim 5, further comprising assessing large Bragg angles >50°.

8. The method of claim 5, further comprising using a crystal that increases ray throughput.

9. A method for an X-ray imaging spectrometer employing multi-cone focusing crystal geometry, said method comprising:

attaching a thin crystal slab to a substrate;

machining at least said substrate to have a multi-cone geometry, wherein said multi-cone geometry is determined by superimposing a plurality of cones with different aperture angles on a common nodal line, wherein said plurality of cones includes a cone for each Bragg angle;

providing an X-ray imaging spectrometer, wherein said X-ray imaging spectrometer includes said thin crystal slab having multi-cone geometry and an X-ray detector;

exposing said X-ray imaging spectrometer to an X-ray source, wherein said X-ray source comprises a point-like X-ray source;

thereby providing a rotational symmetry of a ray pattern and imaging each wavelength in a spectral range of interest at a high resolution.

* * * * *